March 30, 1943.   H. E. FENNER   2,315,154
HEAT DEFLECTOR FOR CIRCULATING HEATERS
Filed Dec. 28, 1940
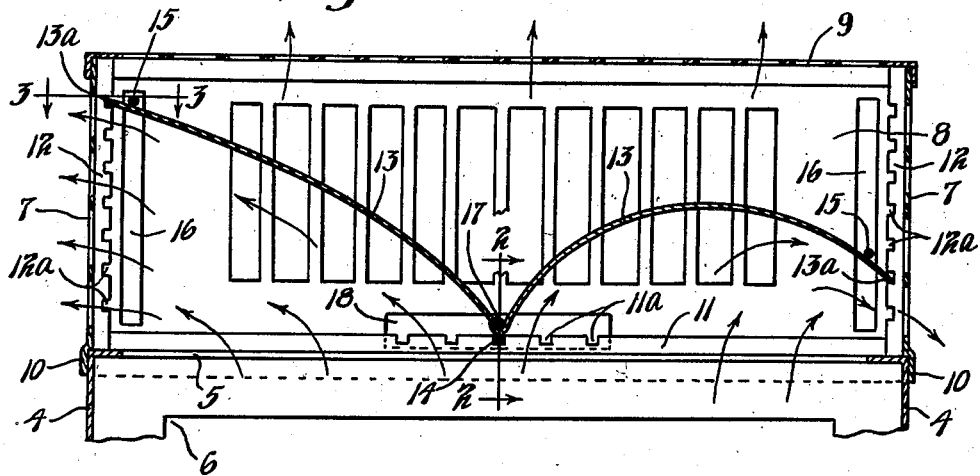
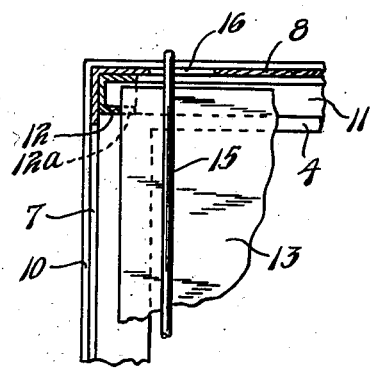
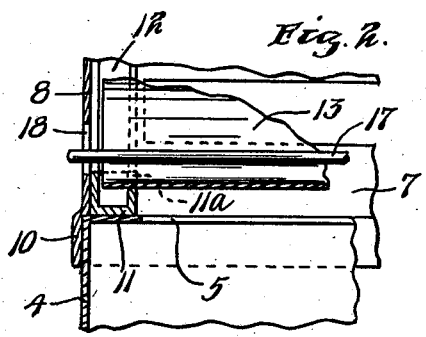
INVENTOR.
HARRY E. FENNER.
BY HIS ATTORNEYS.
Williamson & Williamson Patented Mar. 30, 1943

2,315,154

UNITED STATES PATENT OFFICE 2,315,154

HEAT DEFLECTOR FOR CIRCULATING HEATERS

Harry E. Fenner, Eau Claire, Wis., assignor of one-half to Donald Boyd, Eau Claire, Wis.

Application December 28, 1940, Serial No. 372,214

3 Claims. (Cl. 98—40)

This invention relates to heating appliances for devices which deflect heat issuing from the upper heat outlet of a space heater such as the commonly known circulating heater.

It is an object of my invention to provide a heat deflector for use in conjunction with a circulating heater which will intercept heated air and deflect it outwardly rather than permit it to rise vertically from the heater under the influence of ordinary convection flow.

Another object of the invention is to provide a deflector which can be adjusted to various positions to vary the angle of deflection and also to vary the proportions of the flowing stream of heated air which will deflect in different directions.

Still another object of the invention is to provide a heat deflector which can be built into a circulating heater or can be manufactured as an accessory to be used with a conventional type of circulating heater.

These and other objects and advantages of the invention will more fully appear from the following description made in connection with the accompanying drawing, wherein like reference characters refer to the same parts throughout the views, and, in which:

Fig. 1 is a fragmentary view in vertical section showing the upper portion of a circulating heater and an embodiment of my invention mounted thereon;

Fig. 2 is a fragmentary section taken approximately on the line 2—2 of Fig. 1; and Fig. 3 is a fgragmentary section taken approximately on the line 3—3 of Fig. 1.

In Fig. 1 there is shown the casing 4 of a conventional circulating heater which has an upper heated air outlet 5 which is approximately coextensive with the size of the casing. As is well known in the art, within the casing 4 is a combustion chamber 6 which is spaced from the casing 4 to provide an air circulating passage in the casing around said combustion chamber 6.

Mounted upon the heater casing 4 is a frame comprising open-work end members 7, open-work side members 8, and a grill-work top 9. The bottom of the frame is open. The sides and ends have flanges 10 which are adapted to fit around the top edge portion of the heater casing 4.

The frame has mounted therein a pair of parallel longitudinal lower frame elements 11 and vertically disposed end frame members 12. The horizontal frame members 11 have notches 11a formed therein and the vertical frame members 12 have notches 12a formed therein. The frame members 11 and 12 may be channel shaped as shown or any other suitable shape.

Mounted within the general frame structure is a deflector comprising wing-like portions 13 which may be made of one piece of metal or two pieces joined together to provide a central portion 14. As illustrated in Fig. 1 the wing-like portions 13 of the deflector are arched upwardly and outwardly away from each other. The outer edges 13a of said wing-like deflector portions 13 are adapted to be seated in the notches 12a of the vertical frame members 12, and the central portion of the deflector 14 has its ends thereof seated in oppositely positioned notches 11a of the horizontal lower frame members 11. The wing edges 13a can, of course, be placed in any one of the pairs of oppositely disposed slots in the frame members 12. In Fig. 1 the left-hand wing member 13 is in the uppermost of the notches 12a at the left-hand end of the frame and the right-hand wing 13 is in next to the lowermost pair of oppositely disposed notches 12a in the right-hand vertical frame members 12. The left-hand wing 13a directs the air more nearly horizontally outwardly and the right-hand end wing member 13 directs the air at an angle downwardly towards the floor.

In order to facilitate the adjustable positioning of the wing members 13 I secure rods 15 across said wing members adjacent their edges 13a and these rods extend outwardly through elongated slots 16 which are disposed vertically in the ends of the frame sides 8. This is best brought out in Fig. 3. The ends of the rods 15 can be grasped and the deflector wing moved to a different pair of notches.

The central portion 14 where the deflector wings 13 come together is provided with a transverse rod 17 which extends outwardly through horizontal slots 18 in lower medial portions of said frame sides 8. The rod 17 can be grasped and the central deflector portion 14 shifted from the central pair of notches in which it is shown in Fig. 1 to oppositely disposed notches 11a laterally of said central notch. This will vary the amount of air deflected toward one side or the other.

From the foregoing description it will be seen that I have provided a simply constructed yet highly efficient deflector for circulating heaters which will cause heated air rising upwardly through the heater casing to be directed laterally and at various angles with respect to the horizontal. Heat issuing from the heater and directed as described provides much more efficient operation of a circulating heater since air does not rise directly upwardly and remain above the heads of persons in a room.

It will, of course, be understood that various changes may be made in the form, details, arrangement and proportions of the various parts without departing from the scope of my invention.

What is claimed is:

1. A heat deflector for circulating heaters having top heated air outlets comprising, an upper frame portion substantially co-extensive with the top outlet of said heater, said frame including substantially vertical end members, a deflector member supported by said frame portion and including a pair of wing-like flexible sheets joined along adjacent edges, the other edges of said deflector parallel to said joined edges being in transverse engagement with and movable relative to said frame end members, said end members including a plurality of means for engaging and supporting said other edges at any one of a plurality of points vertically of said end members, said frame portion including means in supporting engagement with said flexible sheets where said sheets are joined together, and said sheets at their point of jointure being located below the point of engagement of said other edges with said frame end members, and said sheets at their point of jointure being shiftable relative to said supporting frame portion to different positions toward and away from said end members to vary the amount of heated air deflected by the respective sheets.

2. The combination with a circulating heater having an upper heated air outlet, of a flexible deflector member having a pair of wing-like portions arching outwardly away from each other and being joined at their adjacent edges, a support for the central portion of said deflector where its edges are joined, the central portion of said deflector being shiftable relative to said support toward and away from opposite edges of said deflector, means for retaining said central portion in its shifted positions, said wing-like portions having side edges substantially parallel to said central portion and being substantially horizontally disposed, uprights positioned adjacent said side edges of said wing-like portions, and said wing-like portions at their side edges being removably engageable with said uprights at a plurality of vertically spaced points and being movable relative to said uprights to vary the height and shape of each of the wing-like portions of said flexible deflector.

3. A heat deflector for circulating heaters having top heated air outlets comprising, a frame substantially co-extensive with the top outlet of said heater, said frame including horizontal side members and vertical end members, a deflector including a pair of flexible sheets forming a wing-like unit having a transverse central portion and having opposite edges parallel to said transverse central portion, said frame end members including a plurality of means for detachably engaging said end edges at any one of a plurality of points vertically of said end members, said central transverse deflector portion being supported by said horizontal frame members in detachable engagement therewith and being movable longitudinally of said frame side members to vary the amount of heated air deflected by the respective sheets, and said central transverse deflector portion being located below the points of engagement of said deflector end edges with said frame end members.

HARRY E. FENNER.